United States Patent [19]

Hou et al.

[11] Patent Number: 5,385,639

[45] Date of Patent: Jan. 31, 1995

[54] DEINKING WASTEPAPER PRINTED WITH OIL-BASED INK

[75] Inventors: Mean-Jeng Hou, Tega Cay, S.C.; Narayanasamy Seenivasan, Charlotte, N.C.

[73] Assignee: Hoechst Celanese Corporation, Somerville, N.J.

[21] Appl. No.: 113,549

[22] Filed: Aug. 27, 1993

[51] Int. Cl.⁶ .............................................. D21C 5/02
[52] U.S. Cl. ........................................ 162/5; 162/4; 162/72; 162/8
[58] Field of Search ........................... 162/4, 5, 72, 8

[56] References Cited

U.S. PATENT DOCUMENTS

| | | | |
|---|---|---|---|
| 4,043,908 | 8/1977 | Roberts et al. | 210/43 |
| 4,673,729 | 6/1957 | Schroer et al. | 528/397 |
| 4,689,374 | 8/1987 | Hansson et al. | 525/435 |
| 4,871,483 | 10/1989 | Friel, Jr. et al. | 260/404.5 |
| 4,997,523 | 3/1991 | Peuse et al. | 162/5 |
| 5,211,809 | 5/1993 | Nadden et al. | 162/6 |
| 5,238,533 | 8/1993 | Engelskurchen et al. | 162/4 |

OTHER PUBLICATIONS

L. D. Ferguson, "Deinking Chemistry: Part 1", *Tappi Journal*, pp. 75-83 (Jul. 1992).
L. D. Ferguson, "Deinking Chemistry: Part 2", *Tappi Journal*, pp. 49-58 (Aug. 1992).
B. R. Read, "The Chemistry of Flotation Deinking", *Tappi Proceedings, 1991 Pulping Conference*, pp. 851-856.
J. Jossinet, "Custom Deinking of Newsprint", *77th Annual Meeting Technical Section Canadian Pulp & Paper Association*, pp. 369-372 (1991).
L. D. Ferguson, "The Role of Pulper Chemistry in Deinking", *Tappi Proceedings, 1991 Pulping Conference*, pp. 793-799.
T. W. Woodward, "Appropriate Chemical Additives Are Key to Improved Deinking Operations", *Pulp & Paper*, pp. 59-63 (Nov. 1986).
T. W. Woodward, "Deinking Chemistry", *1991 Chemical Processing Aids Short Course*, pp. 85-105.
A Shrinath et al., "A Review of Ink-Removal Techniques in Current Deinking Technology", *July 1991 Tappi Journal* pp. 85-93.
L. L. Tural et al., "Effect of HLB Factor of Nonionic Surfactants on Deinking Efficiency", *Tappi Jounral*, pp. 167-168 (Nov. 1977).

(List continued on next page.)

*Primary Examiner*—W. Gary Jones
*Assistant Examiner*—Mark De Simmone
*Attorney, Agent, or Firm*—Rosemary M. Miano

[57] ABSTRACT

A process is disclosed for deinking pulp which has been made from paper printed with oil based ink. The process uses a surfactant component with and at least one alkoxylated diamine selected from Formula I:

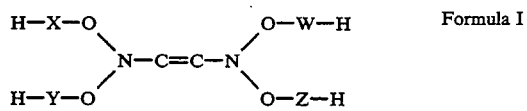

where X, Y, W and Z may be alike or different and are each independently selected from the group consisting of (i) $-(CH_2-CH(CH_3)-O)_a(CH_2-CH_2-O)_b-$;

(ii) $-(CH_2-CH_2-O)_c(CH_2-CH(CH_3)-O)_d-$; and (iii) random copolymers of ethylene oxide and propylene oxide, wherein a, b, c and d are each selected independently to be a number between 1 and 30 so as to give an HLB value between 5-15.

8 Claims, 2 Drawing Sheets

OTHER PUBLICATIONS

W. B. Darlington, "A New Process for Deinking Electrostatically-Printed Secondary Fiber", *January 1989 Tappi Journal*, pp. 35–38.

K. Schriver, "Mill Chemistry Must be Considered Before Making Deink Line Decision", *Pulp & Paper*, pp. 76–79 (Mar. 1990).

T. Quick et al., "Xerography Deinking–A Fundamental Approach", *Tappi Journal*, pp. 102–106 (Mar. 1986).

J. M. Zabala et al., "Deinking at Papelera Peninsular and the Philosophy of Deinking System Design", *August 1988 Tappi Journal*, pp. 62–68.

D. Lachenal et al., "Hydrogen Peroxide as a Delignifying Agent", *Tappi Journal*, pp. 119–122 (Apr. 1980).

R. G. Horacek et al., "Chemical Application Expands in Washing/Flotation Deinking Systems", *Pulp & Paper*, pp. 97–99 (Mar. 1989).

J. S. Aspler, "Newsprint Contributions to Reboff of Oil-Based Inks", *1990 International Printing and Graphic Arts Conference*, pp. 21–30.

K. Hornfeck, "Chemicals and Their Mode of Action in the Flotation Deinking Process", *Conservation & Recycling, pp. 125–132 (1987)*.

J. T. Mattingley, "Residual Chemical Effects in Secondary Fibre Operations", *Tappi Proceedings, 1983 Pulping Conference*, pp. 515–523.

D. W. Suwala et al., "A Study of the Deinking Efficiency of Monionic Surfactants", *Tappi Proceedings, 1983 Pulping Conference*, pp. 533–541.

D. L. Wood, "Alcohol Ethoxylates and Other Nonionics as Surfactants in the Deinking of Waste Paper", Tappi Proceedings, 1982 Pulping Conference, pp. 435–446.

W. C. Griffin, "Classification of Surface-Active Agents by HLB", *Journal of the Society of Cosmetic Chemists*, pp. 311–327 (1949).

Trade Literature–"Guideline Formulations: Part 1. Liquid Detergents" (Jun. 1993).

Tappi, Standard Method T 205 om-88, "Forming Handsheets for Physical Tests of Pulp", 1988.

DEINKING WASTEPAPER PRINTED WITH OIL-BASED INK

BACKGROUND OF THE INVENTION

Recycling of paper is taking on increasing importance as demands on resources increase. One of the aspects of recycling that is particularly challenging is the area of deinking. Various aspects of deinking are described in the literature. See, for example, L. D. Ferguson, "Deinking Chemistry: Part 1" *TAPPI Journal*, pages 75–83 (July 1992), and "Deinking Chemistry: Part 2" *TAPPI Journal*, pages 49–58 (August 1992); B. R. Read, "The Chemistry of Flotation Deinking", *TAPPI Proceedings*, 1991 *Pulping Conference*, pages 851–856; J. Jossinet, "Custom Deinking of Newsprint", *77th Annual Meeting Technical Section Canadian Pulp & Paper Association*, pages 369–372 (1991); L. D. Ferguson, "The Role of Pulper Chemistry in Deinking" *TAPPI Proceedings*, 1991 *Pulping conference*, pages 793–799; T. W. Woodward, "Appropriate Chemical Additives Are Key to Improved Deinking Operations", *Pulp & Paper*, pages 59–63 (November, 1986); and T. W. Woodward, "Deinking Chemistry", 1991 *Chemical Processing Aids Short Course*, pages 85–105. Washing deinking and flotation deinking are the two major types of deinking processes. Some preference is given to flotation deinking because it uses less water.

Various approaches have been tried to improve flotation processes for oil-based inks. These approaches have included searching for chemicals that give improved results traditionally, fatty acid or soap have been used as collectors for flotation deinking. However, these chemicals have to be used in large dosages and cause deposit problems, (due to the residue of fatty acid) at the downstream of papermaking process. A variety of chemicals have been tried to obtain improved performance in the deinking process they have had mixed results. Many nonionic surfactants have been used, including alkoxylates of fatty acids, long chain alcohols, and even some fatty oil or natural fat.

Thus, an object of the present invention is to provide an improved process for deinking pulp which comes from sources containing oil-based ink. It is a further object of this invention to provide a deinking process which gives improved results with flotation. These and other objects of the invention will be apparent from the following description.

SUMMARY OF THE INVENTION

This invention provides a method for deinking pulp made from paper which has been printed with oil-based ink. The method comprises pulping the paper with water at a temperature from 25 to 85 degrees C. (preferably in an alkaline environment), diluting the pulp to the desired consistency, mixing the pulp with 0.1–0.6% by weight based on the oven-dried (OD) weight of the pulp of one or more non-ionic surfactants selected from the group consisting of alkoxylated diamines of Formula I:

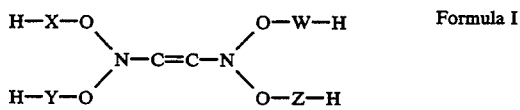

Formula I where X,Y,W and Z may be alike or different and are each independently selected from the group consisting of (i) —$(CH_2$—$CH(CH_3)$—$O)_a(CH_2$—$CH_2$—$O)_b$—;

(ii) —$(CH_2$—$CH_2$—$O)_c(CH_2$—$CH(CH_3)$—$O)_d$—; and (iii) random copolymers of ethylene oxide (EO) and propylene oxide (PO)

wherein a, b, c and d are each selected independently to be a number between 1 and 30 so as to give an HLB value between 5–15.

Optionally, various surfactants can be used in conjunction with the above-mentioned surfactants. These include (but are not limited to) EO/PO copolymers and castor oil ethoxylates. For example, up to 50% by weight of other non-ionic surfactants such as ethylene oxide/propylene oxide copolymers or castor oil ethoxylates (or other nonionic surfactants compatible with the invention) may be used in combination with compounds of Formula I.

The mixture is then treated in a floatation cell (for examples of the types currently commercially available) and dewatered using techniques known to those in the art to obtain the recycled product.

The process of this invention may be practiced so as to minimize the solids lost during the flotation process.

DESCRIPTION OF THE DRAWINGS

FIG. 1. Deionized water 1 is heated to about 45 degrees C. either before or on during the charging of a pulper 2. Wastepaper 3 (for example, 70% New York Times and 30% New York Times Magazine) is added to the pulper 2 and pulping is continued for 30 minutes at 45 degrees C., a pH between 9.5-9.7 and 15% consistency. Other chemicals 4 may also be added before the pulping is completed. These include 0.2–1.5% NaOH, 0.75–1.5% peroxide, 0.1–0.6% of a deinking surfactant or deinking compound of this invention and a chelate such as 0.1–0.3% DTPA.

Preflotation conditioning 5 is then done by adding enough hot water (45 degrees C.) to dilute the pulp to about 1% consistency and maintaining the pulp slurry at about 45 degrees C. for 30 minutes.

Flotation 6 is then initiated and allowed to proceed for about 5 to 10-minutes while maintaining the pulp at about 1% consistency.

The accepted pulp 7 is used to make handsheets and brightness is determined at step 8. Rejected pulp 9 is evaluated for stock loss and water loss.

Figure 1:
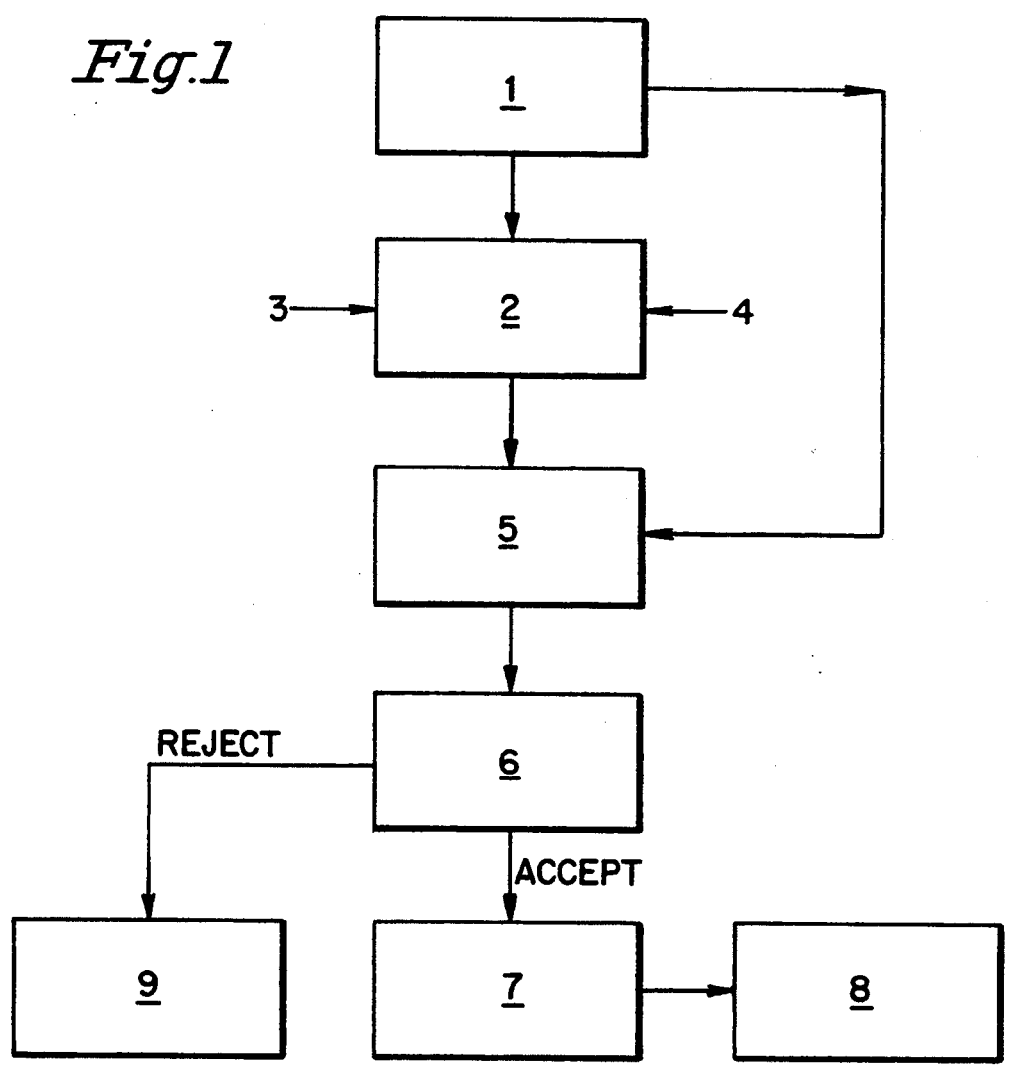
FIG. 1 shows a flow diagram of a deinking process which may be used with this invention.
Figure 2:
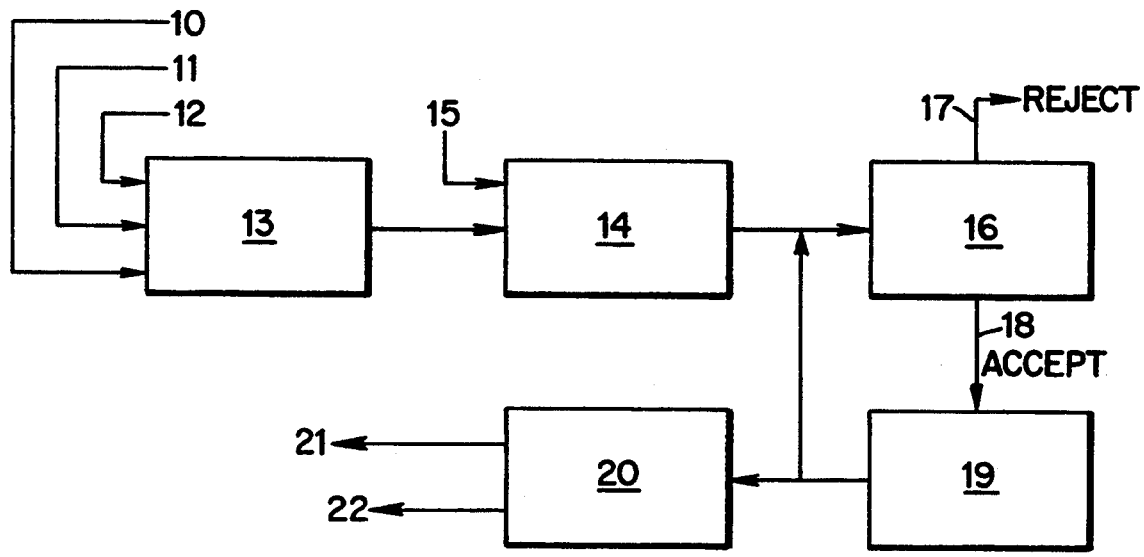
FIG. 2 shows a schematic diagram of a simpler deinking process suitable for use on a pilot plant level.

In FIG. 2, hot water 10, deinking chemicals (such as caustic, surfactants, and $CaCl_2$) 11, and furnish 12 made with paper printed with oil-based ink are charged to a pulper 13 at a temperature between 45 degrees C. and 55 degrees C. (for example, 48–49 degrees C.), and a consistency of 15% (for example, 15%). After pulping has been completed for the desired time 2–5 minutes, the slurry is transferred to a dilution tank. Dilution water 15 is added which is sufficient to reduce the consistency of the pulp to about 1% and the temperature is maintained at about 48–49 degrees C. The pulp slurry is then transferred to a flotation cell 16 and the flotation process is run for the desired time. Rejected material 17 is removed during flotation and placed in a suitable container. The deinked pulp 18 is transferred to an accept tank 19 where the temperature is maintained at about 45–48 degrees C. and the consistency is about 1%. The pulp is then transferred to a rotary drum washer at about 45–48 degrees C. and 1% consistency. The accept pulp 21 is then dewatered and the filtrate 22 is discarded or recycled after clarification.

Figure 3:
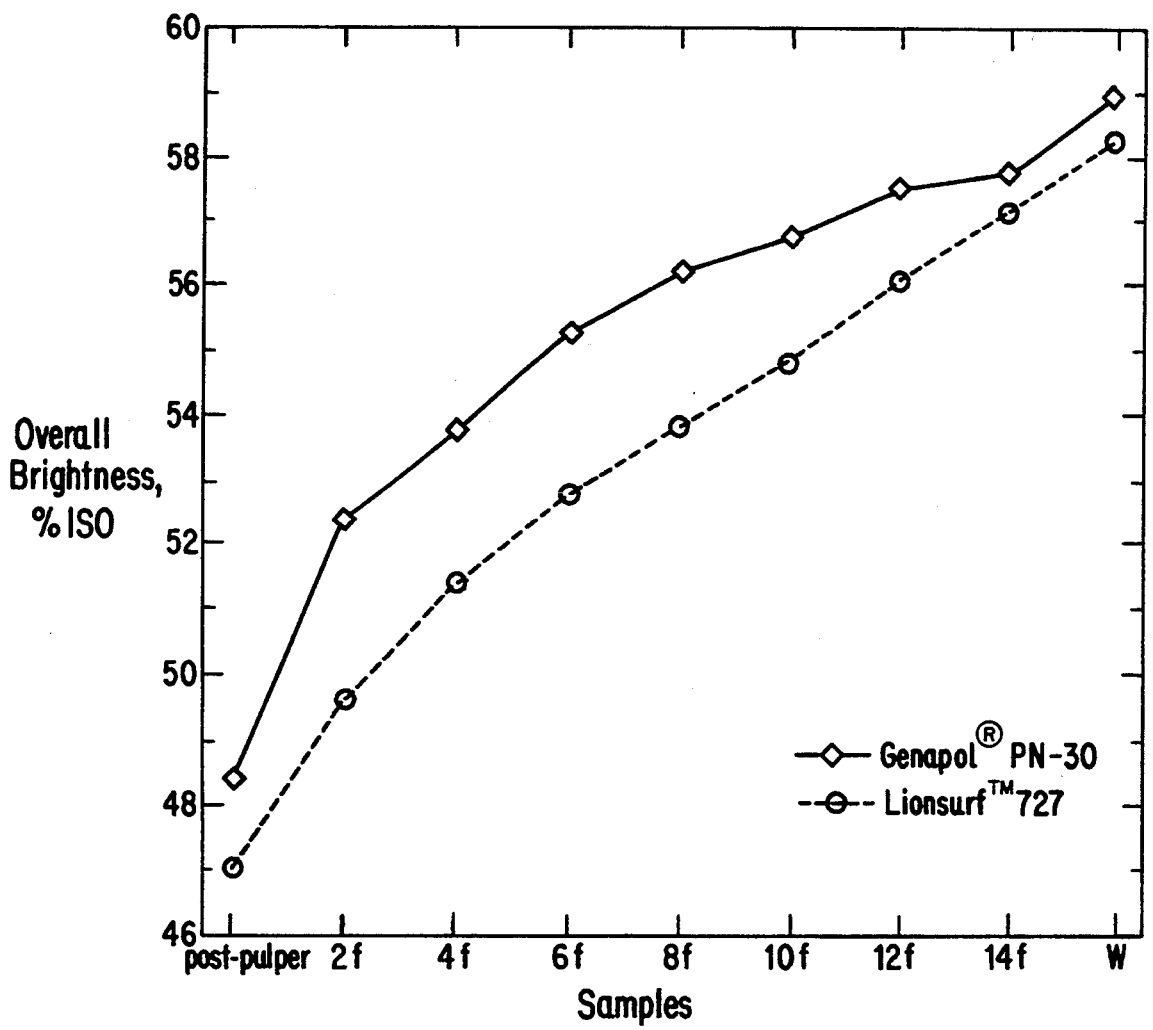
FIG. 3 shows comparative brightness data between the process of this invention versus a conventional deinking system.

FIG. 3 shows comparative data between a compound using the present invention, Genapol ® PN-30 described below and a commonly used material. Lionsurf ® 727 proprietary blend of nonionic surfactants. The overall brightness of deinked pulp is shown as a function of different deinking stages. The notations 2F and 4F stand for flotation times of 2 and 4 minutes, respectively. The notation W stands for post-washing stage. FIG. 3 shows the superior performance of compounds used in the present invention and reflects data from Examples 7 and 8.

DESCRIPTION OF THE INVENTION AND DESCRIPTION OF THE PREFERRED EMBODIMENT

The process of this invention provides a method for deinking pulp containing oil based ink wherein the method comprises first pulping the paper (which optionally may be preshredded) with water at a temperature from 25 to 85 degrees C., especially 35 to 55 degrees C., in an aqueous environment which may range from acidic to alkaline, but preferably is alkaline, such as in the range of 7.5 to 11.5. The alkaline environment is made by adding up to 2 percent by weight of a base such as NaOH or soda ash. The aqueous slurry may also contain other additives such as chelates, sodium silicate, builders, and bleaching agents such as hydrogen peroxide which have been added to the pulp slurry at various points in the pulping process. The alkaline pulp slurry is then diluted to form a pulp of the desired consistency. It is preferred that consistencies from 0.8 to 3.0, and especially from 0.8 to 1.2 be used as they seem to give good results on deinking equipment currently available. The pulp slurry is then mixed with one or more alkoxylated diamines of Formula I described above. One example of such a diamine is Genapol ® PN-30 (Hoechst Celanese Corporation, Somerville, N.J.). Genapol ® PN-30 is an EO/PO block copolymer based on ethylene diamine with a total of 47 mole EO and 47 mole PO. Genapol ® PN-30 can be described as a compound of Formula I with

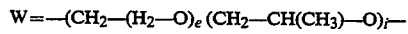

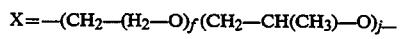

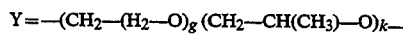

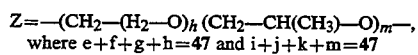

where $e+f+g+h=47$ and $i+j+k+m=47$

It is particularly suitable to add a compound of Formula I before charging the pulper with wastepaper and other chemicals.

Preferred compounds are those compounds of Formula I where each of a, b, c and d are independently selected from the integers 5–15.

The HLB number (hydrophile-lipophile balance or HLB system) is a quantitative way known to those skilled in the art of correlating the chemical structure of surfactant molecules with their surface activity. For compounds of Formula I the HLB number is preferably selected to be a number from 5 to 15.

It is also important that the process be conducted to minimize the loss of solid pulp during the flotation step. Care should be taken in selecting the degree of alkalinity so that the fibers are swollen enough to free the ink, but not so much that the fiber goes out in the waste with the ink. Over-reduction of particle size decreases the efficiency of flotation deinking. A pH in the range of 7.5 to 11 is preferable.

After pulping, the mixture is then processed through a floatation cell, drum washer and so on as shown in the diagram in FIG. 2. The flotation process may be repeated using equipment known to those skilled in the art until a product of the desired brightness is achieved or until it no longer is cost effective to repeat the process. A washing process, (for example, drum washing) is then used to clean the product further and to raise the consistency. The slurry is finally dewatered and may be dried on a drum drier to obtain a finished product. General discussions of these techniques may be found in the cited references and are known to those skilled in the art. For example, T. W. Woodward/TAPPI 1986 Papermaking Chemical Processing Conference.

With respect to the floatation cell, the diluted pulp is cycled and recycled through the cell for a retention time of 1 to 20 minutes or until the desired brightness or cleanliness is achieved.

All of the deinking surfactants described in the Examples are commercially available, although any mixtures referenced herein may have to be blended. Other compounds of Formula I which are not commercially available may be made by techniques known to those skilled in the art.

The equipment useful in practicing the method of this invention is described in more detail in the Examples. Some of the equipment was commercially available, some was custom made and other items are modifications of commercially available items. Generally commercially available equipment may also be used. One particular type of flotation cell useful in this invention is as follows. The flotation cell has four inlets, located tangentially to a cylindrical container, for sparging fine air bubbles into the pulp. Depending on the size of the chamber, not all 4 inlets should be used at the same time. The pulp rises to the accept zone while circulating in the feed zone.

EXAMPLES

The following Examples are offered as being illustrative of the invention but should not be construed as limitations thereon. All chemical symbols and abbreviations have their ordinary and accustomed meanings, unless otherwise indicated. Thus, mm is millimeter, cm is centimeter, m is meter, g is gram(s), degrees C is for Centigrade, ppm is parts per million, min or f is minute, gpm is gallon per minute, psi is pounds per square inch, psig is pounds per square inch (gauge), O.D. is oven-dried, DTPA is diethylene triamine pentaacetic acid, min is minute(s), N/A is not available.

Note that Lionsurf ™ 727 is a proprietary blend of nonionic surfactants. Emulsogen ® EL-300 is a reaction product of 1 mole Castor oil and 30 moles of ethylene oxide. Emulsogen ® EL-360 is a reaction product of 1 mole Castor oil and 36 moles of ethylene oxide. Genapol ® PF-40 is a block copolymer of 60 weight percent propylene oxide and 40 weight percent ethylene oxide. Note that the washing process involves diluting and then thickening the pulp (by dewatering).

EXAMPLES 1-2

Combination Flotation and Washing Process

A 2 liter Hobart mixer was modified for accurate temperature control. The mixer was charged with hot deionized water (870 g at 45° C.), NaOH (1.8 g), sodium silicate (3.75 g), DTPA (0.6 g), hydrogen peroxide (15 g of 50% $H_2O_2$), and either 0.15 g (Example 1) or 0.30 g (Example 2) of an ethylene diamine alkoxylate (Genapol ® PN-30). After all the mixer contents had been uniformly mixed, waste paper comprised of old newsprint (114.13 g) and used magazines (47.37 g) was cut into pieces approximately 2.54 cm by 2.54 cm (1 inch by 1 inch) and the cut material was then added to the Hobart mixer while the mixer was running. Total pulping time was 30 minutes. This allowed full disintegration of the waste paper. After pulping was completed, the pulp slurry was transferred to a stainless steel beaker and diluted to 1% consistency. This diluted slurry was maintained at a temperature of 45° C. with gentle stirring for 30 minutes before flotation. The flotation was done in a laboratory flotation machine (Wemco, Salt Lake City, Utah). Two separate batches of 5.3 liters each of 1% consistency slurry were deinked in the flotation cell; one was treated for 5 minutes and one was treated for 10 minutes. After flotation was completed, washing was simulated by making handsheets in a British Handsheet Machine (a standard 16 cm diameter hand-sheet forming equipment recommended by TAPPI).

Handsheets were made in the British sheet mold according to TAPPI Test Method T205 om-88, incorporated by reference in its entirety herein. Three handsheets were made for each pulp tested. To determine the degree to which the pulp had been cleaned, the ISO brightness of each handsheet was measured by a Technidyne brightness meter. Brightness was determined by averaging the readings taken at four different locations on each side of the handsheet. The stock loss during flotation was determined by measuring the weight of the total solid from the reject of flotation cell and the water loss was determined by measuring total weight of liquid rejected from the flotation cell.

EXAMPLES 3-6

Combination Process with Comparative Tests

The procedure described in Examples 1-2 was repeated except that the Genapol ® PN-30 was replaced with 0.15 g (Example 3), 0.30 g (Example 4) and 0.45 g (Example 5) of Lionsurf ™ 727 (a leading deinking agent from Lion Industries, Vancouver, Wash.). As a control (Example 6), the deinking procedure of Examples 1-2 was also repeated without using any deinking surfactant. The results of these Examples are found in Tables I and II. The data in Tables I and II indicate that the use of the Genapol ® PN-30 material resulted pulp with good brightness and less stock loss and water loss as compared to the commercial deinking agent.

TABLE I

| | Comparison of Deinking Performance Brightness of Deinked Pulp | | | |
|---|---|---|---|---|
| | | Brightness of Deinked Pulp (ISO) | | |
| | Deinking | After 5 Min. Flotation | | After 10 Min. Flotation | |
| Example | Surfactant Used | Felt Side | Wire Side | Felt Side | Wire Side |
| 1 | 0.15 g Genapol ® PN-30 | 57.21 | 56.11 | 59.30 | 58.88 |
| 2 | 0.30 g Genapol ® PN-30 | 57.39 | 56.45 | 60.06 | 59.88 |
| 3 | 0.15 g Lionsurf ™ 727 | 57.06 | 55.67 | 59.40 | 58.52 |
| 4 | 0.30 g Lionsurf ™ 727 | 57.03 | 56.00 | 59.51 | 59.24 |
| 5 | 0.45 g Lionsurf ™ 727 | 57.92 | 56.05 | 60.37 | 59.75 |
| 6 | None | N/A | N/A | 49.5 | 49.4 |

TABLE II

| | Comparison of Deinking Performance Stock Loss and Water Loss During Deinking | | | | |
|---|---|---|---|---|---|
| | | Stock Loss (%) | | Water Loss (ml) | |
| | Deinking Surfactant | 5 Min. Flotation | 10 Min. Flotation | 5 Min. Flotation | 10 Min. Flotation |
| Example | Used | Felt Side | Wire Side | Felt Side | Wire Side |
| 1 | 0.15 g Genapol ® PN-30 | 7.9 | 10.8 | 352 | 474 |
| 2 | 0.30 g Genapol ® PN-30 | 7.8 | 12.6 | 353 | 476 |
| 3 | 0.15 g Lionsurf ™ 727 | 9.6 | 12.4 | 427 | 537 |
| 4 | 0.30 g Lionsurf ™ 727 | 10.13 | 14.4 | 480 | 608 |
| 5 | 0.45 g Lionsurf ™ 727 | 9.8 | 17 | 579 | 738 |
| 6 | None | N/A | 1.3 | N/A | 109 |

EXAMPLES 7-8

Deinking of Mixed Wastepaper in Pilot Plant

The deinking equipment used was the Formax 1800 high consistency pilot plant pulper, the custom-made flotation cell of 28.5 liter (7.5 gallon) capacity, and 0.3 m by 0.9 m (1 foot by 3 foot) pilot drum washer from Komline Sanderson previously described above. The flow diagram of the procedure is shown in FIG. 2.

Hot water (8.6 liter at 48°–49° C.), NaOH (19.5 g), sodium silicate (32.5 g), DTPA (1.95 g), hydrogen peroxide (26 g of 50% $H_2O_2$) and deinking surfactant (3.9 g of Genapol ® PN-30 for Example 7 and (3.9 g of Lionsurf ™ 727 for Example 8) were charged to the pulper. After the contents of the pulper were thoroughly mixed and dissolved, waste paper comprising 70% old newsprint and 30% magazine were added to the pulper. The waste paper was slushed in the pulper for 5 minutes and was then discharged to a tank, where it was diluted with hot water at 48°–49° C. to about 1% consistency. The diluted slurry was allowed to stay in the feed tank for about 5 minutes to assure full de-flaking of high consistency fiber lump. During flotation, the pulp was pumped through two tangential inlets as described above where the slurry was mixed with air before entering the flotation cell at 15 gpm. The accept from the flotation cell was returned to the cell in a continuous process as described above until the desired retention time in the flotation cell was achieved. During flotation, sampling was done by taking accept at various time intervals. Washing was done by pumping 1% consistency slurry to the drum washer to be thickened to around 20% consistency. The vacuum applied during pick-up and thickening was about 508 mm (20 inches of mercury). Brightness pads were prepared as described in Examples 1–2. The data is recorded in Table III. These results indicate that the Genapol ® PN-30 material removed ink far more efficiently than the Lionsurf ™ 727 material and increased the brightness of the pulp in a short time; improved results are shown even at 2 minutes.

TABLE III

Brightness of Deinked Pulp

| Deinking Stages | Example 7: Genapol ® PN-30 | Example 8: Lionsurf ™ 727 |
|---|---|---|
| Post-Pulper | 48.35 | 47 |
| 2F | 52.4 | 49.6 |
| 4F | 53.8 | 51.35 |
| 6F | 55.3 | 52.8 |
| 8F | 56.3 | 53.9 |
| 10F | 56.8 | 54.85 |
| 12F | 57.6 | 56.15 |
| 14F | 57.8 | 57.2 |
| Post-Washing | 59 | 58.3 |

EXAMPLES 9–11

In order to illustrate the options of using a surfactant mixture by combining the above-mentioned Genapol ® PN-30 with other surfactants, three blends were made with compositions shown in Table IV. The procedure described in Example 7–8 was repeated but the blends were used instead of the single Genapol ® PN-30 material. The results are shown in Table V. Thus, blends of selected surfactants can be used to obtain reasonably good deinking performance.

TABLE IV

| Example | Surfactant Blends | Composition |
|---|---|---|
| 9 | A | 15% Emulsogen ® EL-300 + 85% Genapol ® PN-30 |
| 10 | B | 15% Emulsogen ® EL-360 + 85% Genapol ® PN-30 |
| 11 | C | 15% Genapol ® PF-40 + 85% Genapol ® PN-30 |

TABLE V

Brightness of Deinked Pulp, % ISO

| | Blend A | Blend B | Blend C |
|---|---|---|---|
| Post-Pulping | 51.70 | 50.35 | 50.45 |
| 2 min. flotation | 53.70 | 52.85 | 53.00 |
| 4 min. flotation | 55.35 | 54.15 | 54.40 |
| 6 min. flotation | 56.35 | 54.75 | 55.35 |
| 8 min. flotation | 56.55 | 55.85 | 56.40 |
| 8 min. flot. washing | 58.20 | 56.15 | 57.50 |

What is claimed is:

1. A method for deinking pulp which has been made from paper printed with oil-based ink wherein said method comprises:
   a) pulping the paper with water at temperature of 25–85 degrees C. in alkaline conditions;
   b) diluting the pulp to a consistency of 0.8–3.0%;
   c) mixing the pulp with at least one alkoxylated diamine of Formula I:

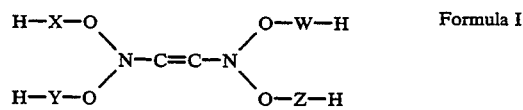

Formula I where X, Y, W and Z may be alike or different and are each independently selected from the group consisting of (i) $-(CH_2-CH(CH_3)-O)_a(CH_2-CH_2-O)_b-$;

(ii) $-(CH_2-CH_2)-O)_c(CH_2-CH(CH_3)-O)_d-$; and (iii) random copolymers of ethylene oxide and propylene oxide, wherein a, b, c and d are each selected independently to be a number from 1–30 so as to give an HLB value of 5–15; and d) treating said pulp in a flotation cell.

2. A process as claimed in claim 1 wherein the alkoxylated diamine of Formula I is replaced in an amount of up to 50% with a nonionic surfactant.

3. A process as claimed in claim 2 wherein said nonionic surfactant is selected from the group consisting of ethylene oxide/propylene oxide copolymers and castor oil ethoxylates.

4. A process as claimed in claim 1 wherein the consistency of said pulp is from 0.8–1.2%.

5. A process as claimed in claim 1 wherein said compound of Formula I is an ethylene oxide/propylene oxide copolymer based on ethylene diamine with a total of 47 moles EO and 47 moles of PO.

6. A process as claimed in claim 1 wherein the temperature of the water is from 35–55 degrees C.

7. A process as claimed in claim 1 wherein the process is carried out at a pH of 7.5–11.5.

8. A process as claimed in claim 1 wherein a, b, c and d are each selected independently to be a number from 5–15.

* * * * *

UNITED STATES PATENT AND TRADEMARK OFFICE
CERTIFICATE OF CORRECTION

PATENT NO. : 5,385,639
DATED : January 31, 1995
INVENTOR(S) : Hou et al

It is certified that error appears in the above—identified patent and that said Letters Patent is hereby corrected as shown below:

Column 1, line 33 -- after "results" and before "traditionally,", a -- period (".") -- should be inserted and the "t" in "traditionally" should be capitalized.

Signed and Sealed this

Fifth Day of September, 1995

*Attest:*

BRUCE LEHMAN

*Attesting Officer*  *Commissioner of Patents and Trademarks*